United States Patent [19]

Richardson

[11] Patent Number: 5,199,206
[45] Date of Patent: Apr. 6, 1993

[54] FISHING ROD WITH LINE DRAG AND RECOVERY DEVICE

[75] Inventor: Francis J. Richardson, 1921 Hunt Meadow Dr., Annapolis, Md. 21403-1636

[73] Assignee: Francis Joseph Richardson, Annapolis, Md.

[21] Appl. No.: 832,307

[22] Filed: Feb. 7, 1992

[51] Int. Cl.$^5$ ............................................. A01K 87/00
[52] U.S. Cl. ......................................... 43/18.1; 43/19.2
[58] Field of Search ................. 43/18.1, 19.2, 15, 4, 43/44.92

[56] References Cited

U.S. PATENT DOCUMENTS

| | | | |
|---|---|---|---|
| 154,141 | 8/1874 | Hill | 43/15 |
| 2,851,811 | 9/1958 | Mantell | 43/18.1 |
| 3,270,457 | 9/1966 | Austin | 43/18.1 |
| 4,162,587 | 7/1979 | Dethlefs | 43/18.1 |
| 4,216,602 | 8/1980 | Daniels | 43/18.1 |
| 4,237,639 | 12/1980 | Uemori et al. | 43/18.1 |

*Primary Examiner*—Richard K. Seidel
*Assistant Examiner*—Chuck Y. Mah

[57] ABSTRACT

A fishing rod with its own fishing line drag and line recovery functions, which interacts with a standard fishing reel with line drag and recovery functions.

6 Claims, 2 Drawing Sheets

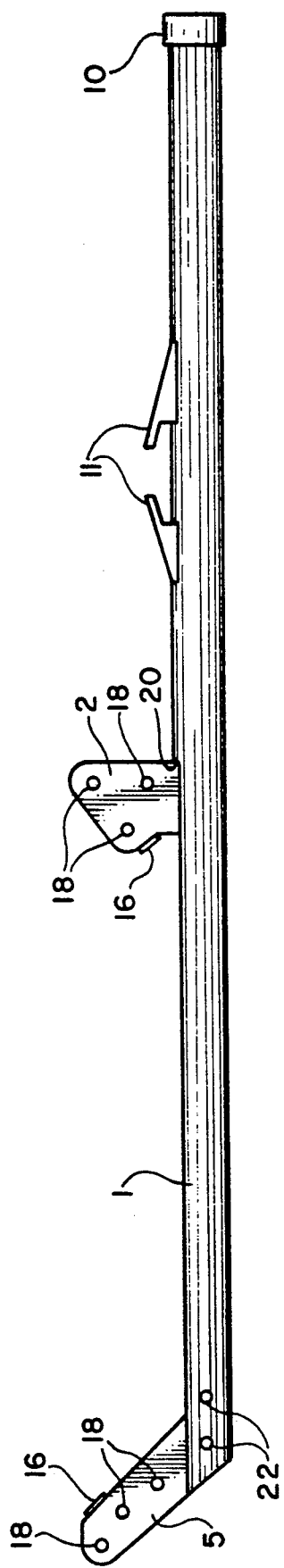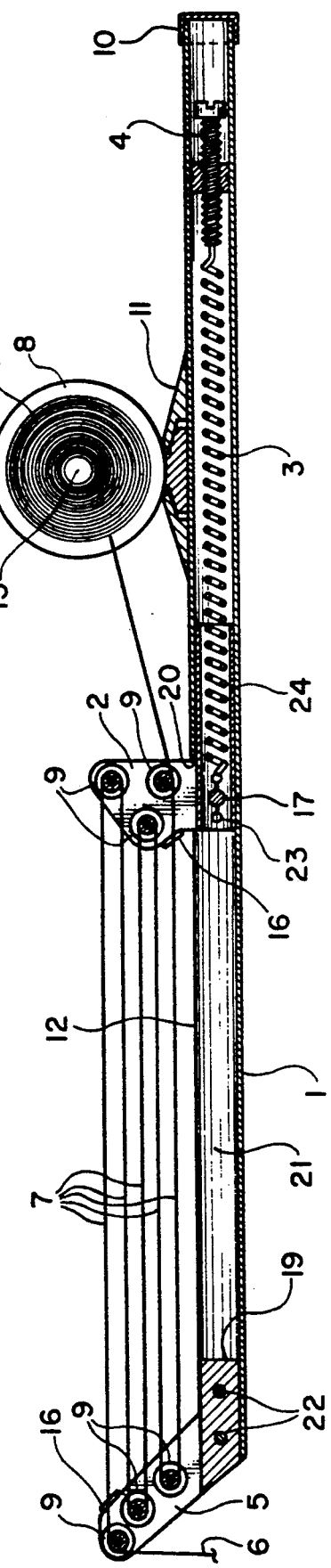

1

FISHING ROD WITH LINE DRAG AND RECOVERY DEVICE

BACKGROUND OF THE INVENTION

1. Field of the Invention

The present invention relates to a short rigid tubular fishing rod and more particularly, with its own line drag and recovery functions which interacts with a conventional reel's line drag and recovery.

2. Description of the Prior Art

Fishing rods of the past were long and required a flexing action of the rod to play the fish. Several undesirable characteristics of the flexing fishing rod are encountered. The length required of a tubular pole to achieve a selected flex of the pole cannot be altered without sacrificing the rod's mechanical functions. The fishing rod length of a conventional fishing rod allows a great leverage advantage for the fish. The leverage advantage gained by a large fish could cause a person to fall into the water when trying to play the fish. Another undesirable characteristic of a tubular flexing fishing rod is, if the rod is flexed past a certain point it will break.

Accordingly, it is a primary object of the present invention to provide a short fishing rod which provides the functional characteristics of flex and tubular resiliency of the longer rod by a mechanical means! It also is a further object to provide fishing line drag and fishing line recovery functions which interact with line drag and line recovery functions of the fishing reel. Two anti line tangle cylinders are used to keep tangle free line.

It is still another object to keep the rod's length at a minimum. The short length of the rod allows less leverage gain for the fish.

The Hill U.S. Pat. No. 154,141 also shows a fishing rod with a spring device. However, the spring device does not interact with a fishing reel.

The Mantell U.S. Pat. No. 2,851,811 also shows a fishing rod with a spring device. However, a mono sliding roller and mono stationary roller is used. The Mantell pataent is a hook setting device. The design of the Mantell patent does not have an anti line tangle device. The Mantell patent also requires a flexing rod since his roller system only allows two times the distance for line travel between the rollers. This patent is awkward and allows too much leverage gain for the fish and is not safe to use at sea. The pulley system on the Mantell patent is designed to snap or jerk the line when the fish strikes at the lure or bait.

The Dethlef U.S. Pat. No. 4,162,587 of a fishing pole comprises at least a pair of hinged mounted, rigid rod sections and a spring biasing the rod sections with a predetermined spring constant. The Dethlef patent lacks a anti line tangle device, a roller guide system and requires a long rod length which is awkward to use.

The Daniels U.S. Pat. No. 4,216,602 uses a roller system. However, it lacks a anti line tangle device, a multi vertical roller assembly and does not interact with a fishing reel. The line drag and line recovery of the rod requires human intervention when playing a fish. The total length of the Daniels rod may be from twelve to thirty feet and requires a flexing pole. The Daniels patent allows great leverage advantage for the fish and is not safe. It also cannot interact with a reel because of the horizontal pulley system.

The Uemori U.S. Pat. No. 4,237,639 is a telescopic fishing rod and not a non-flexing rod.

The Austin U.S. Pat. No. 3,270,457 has a flexing rod and has no roller system.

SUMMARY OF THE INVENTION

The principal object of the present invention is to provide a fishing rod which interacts with a standard fishing reel to provide rod line drag and line recovery functions.

It also is an object of the present invention to provide such a device which is simple to use and made of inexpensive compact construction.

Another object is to provide a fishing rod which may be mounted to a fixed object on a vessel. With the rod mounted to a fixed object, safety at sea increases. One does not have to play the fish with the fishing rod Fish playing functions are accomplished by the fishing rods line drag and line recovery functions. A person only needs to reel the standard fishing reel.

The invention also decreases the chance of fishing line breakage since line drag is not only a function of the standard reel it also is a function of the invention, the fishing rod with line drag and recovery functions. The rod is designed with a short length compared to a conventional rod. Since the length is shorter, less leverage is gained by the fish. The sliding action of the sliding roller assembly creates a great advantage over the flexing action of a standard rod, since the flexing action of the standard rod only allows the line to travel a short distance, compared to the line travel of the invention. The invention with the sliding roller assembly and the line interfaced over numerous rollers allows the line to travel many times the distance between the stationary roller assembly and the sliding roller assembly.

BRIEF DESCRIPTION OF THE DRAWINGS

FIG. 1 is a side profile of the fishing rod with line drag and line recovery functions.

FIG. 2 is a cross sectional view of the rod and reel, plus internal and external parts.

DETAILED DESCRIPTION

The rigid fishing rod -1- is designed for trolling and bottom type fishing. The length of the rod is kept to a minimum. By keeping the rod length short, many advantages are gained. Some of the advantages are: storage, less leverage gain by the fish, not as awkward to use, increased rod strength and human safety.

To emulate the flexing action of a longer flexing rod, two multi vertical roller assemblies are used within the groove -12- of the rod. Each roller assembly has three vertically mounted rollers -9- and does not allow the fishing line to cross paths. When the end of the line -6- is pulled by the fish the sliding multi vertical roller assembly -5- starts to move forward. The rollers -9- turn as line -7- is released to the fish. As the fish increases pull on the end of the line -6- the spring -3- tension increases. When the sliding multi vertical roller assembly -5- slides close to the stop point -19-, the pre-set drag of the fishing reel releases and the spool -15-, which releases the line -7-. When the reel -8- releases the line -7- or the fish decreases pull, the sliding multi vertical roller assembly FIG. -5- starts returning to stop point -20-.

Figure 4:
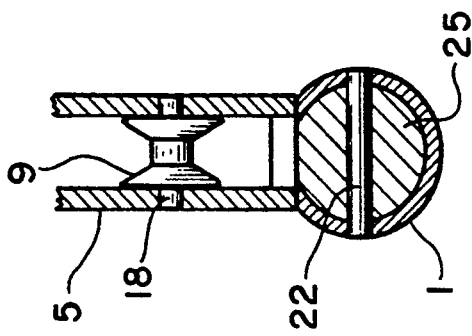
FIG. 4 is an enlarged profile of the forward stationary roller assembly.

The stationary multi vertical roller assembly FIG. -4- does not slide. The rollers -9- are the only parts that move in the stationary roller assembly FIG. -4-.

Figure 3:
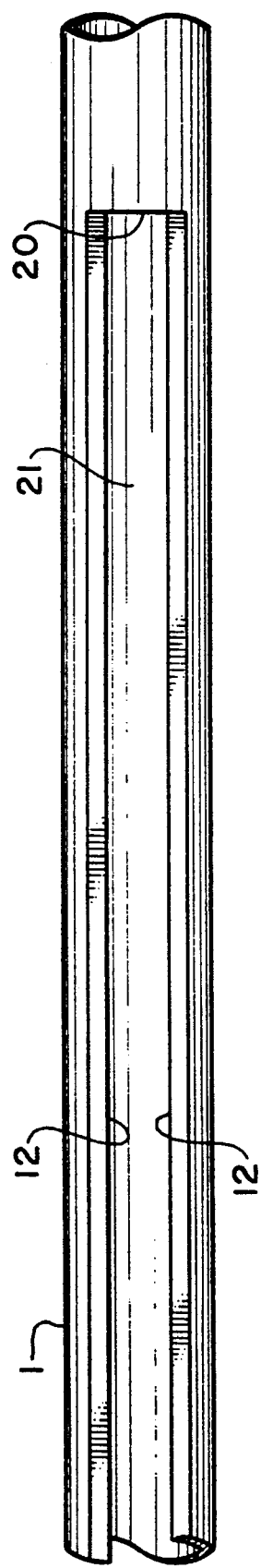
FIG. 3 is an enlarged profile of the external rod cylinder.
Figure 6:
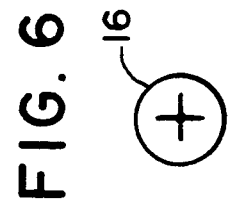
FIG. 6 is an enlarged profile of an anti line tangle device.
Figure 5:
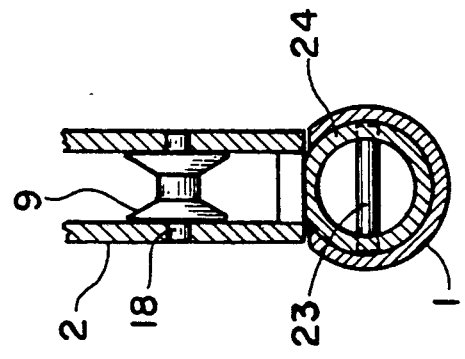
FIG. 5 is an enlarged profile of the sliding roller assembly.

The interaction of the spring -3-, stationary multi vertical roller assembly FIG. -4-, sliding multi vertical roller assembly FIG. -5-, reel -8- and line -7- emulate the flexing action of a much longer flexing fishing rod.

As shown in the drawings, the short one piece, non-flexing fishing rod -1- is machined from a hollow metal tube or a rigid tube type material. A groove -12- is cut in the rod -1- from reference point -20- to the end tip portion of the rod -1-. With the groove -12- cut in the rod -1- a sliding track area -21- is provided for the multi vertical sliding roller assembly FIG. -5-. The groove -12- also provides an insertion area for the stationary multi vertical roller assembly FIG. -4-.

The sliding multi vertical roller assembly FIG. -5- is machined from a metal or rigid material. The sliding multi vertical roller assembly FIG. -5- consists of a metal sliding cylinder -24- which is designed to slide inside the groove -21- of the rod -1-. The metal roller guide plates -2- are welded to the metal sliding cylinder -24-. The rollers -9- are machined from metal and are pinned by pins -18- to the guide plates -2-. The sliding cylinder swivel -17- is pinned by Pin -23-.

The stationary multi vertial roller assembly FIG. -4- is machined from metal or a rigid material. The solid cylinder -25- is machined to fit inside the groove -21- of the rod -1-. The metal roller guide plates -5- are welded to the solid cylinder -25-. The rollers -9- are machined from metal and are pinned by pins -18- to the guide plates -5-. The solid cylinder -25- is pinned by pins -22- to the rod -1- which keeps the stationary multi vertical roller assembly FIG. -4- in a stationary position.

Two anti line tangle devices -16- are used. The first one is welded or pinned to the sliding multi vertical roller assembly guide plates -2- and the second one is welded or pinned to the stationary guide plates -5-. Each anti line tangle device -16- is a hollow metal cylinder. The fishing line -7- is threaded inside the hollow metal cylinders. Groment or packing material is packed around the line -7- inside the hollow cylinder and used to keep pressure on the line -7- which prevents the line from tangling. The alignment of each anti line tangle device -16 allows the line to travel freely.

The spring device -3- is inserted inside the hollow rod -1-. One end of the spring device -3- is connected to the swivel -17- and the other end is connected to the spring device adjustment screw -4-. The tension of the spring device -3- can be adjusted by the spring device adjustment screw -4-. A butt cap -10- is removed to gain access for adjustment of spring -3-. The reel mount -11- is welded or screw fastened to rod -1- to hold the reel -8- in place.

To fish with the fishing rod a conventional trolling reel is fastened to the reel mount of the rod. The line is fed from the reel and sequenced under and over the rollers -9-, as shown in FIG. -2-. A lure or hooked bait is tied to the end of the line. The functions of the conventional reel are used to pay out line and retrieve line plus line drag operation.

While the preferered embodiments of the invention have been illustrated and described, it should be apparent that variations will be apparent to one skilled in the art without departing from the principles herein (example increasing the number of vertical rollers). Accordingly, the invention is not to be limited to the specific embodiment shown in the drawings.

I claim:

1. A fishing rod having means for line drag and line recovery, which interacts with a conventional reel's line drag and line recovery, comprising:
    a one-piece rod fabricated of rigid hollow material, having a longitudinal groove at one end and a drag adjustment screw at the other end; said groove having a sliding multi vertical roller assembly movable longitudinally thereof;
    said sliding multi vertical roller assembly having three pinned rollers, two guide plates welded to a sliding cylinder and an anti line tangle means; a swivel attaching to said sliding cylinder;
    a stationary multi vertical roller assembly having three pinned rollers and two guide plates welded to a stationary cylinder and an anti line tangle means, fixedly mounted at one end of said groove;
    an internal rod spring device having two ends, one end of the spring being connected to the swivel of the sliding cylinder and the other end of the spring being connected to the drag adjustment screw, whereby
    a fishing line from a conventional fishing reel is sequenced by said sliding vertical multi roller assembly, said stationary vertical multi roller assembly and said anti line tangle means, thereby preventing the fishing line from tangling.

2. The fishing rod as set forth in claim 1, in which said sliding multi vertical roller assembly is provided with multi vertically mounted rollers and does not allow the fishing line to cross paths.

3. The fishing rod as set forth in claim 1, in which said stationary multi vertical roller assembly is provided with multi vertically mounted rollers and does not allow the fishing line to cross paths.

4. The fishing rod as set forth in claim 1, wherein said anti line tangle means are hollow metal cylinders.

5. The fishing rod as set forth in claim 1, in which no human intervention is required to handle said line drag and said line recovery functions of the rod when playing a fish.

6. The fishing rod as set forth in claim 1, in which said rod drag is set by the adjustment screw.

* * * * *